United States Patent
Ito et al.

(10) Patent No.: US 7,072,112 B2
(45) Date of Patent: Jul. 4, 2006

(54) PROTECTIVE FILM FOR POLARIZING FILTER AND METHOD FOR PRODUCING THEREOF AND POLARIZING FILTER

(75) Inventors: Takashi Ito, Kanagawa (JP); Hiroshi Nakashima, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 83 days.

(21) Appl. No.: 10/382,572

(22) Filed: Mar. 7, 2003

(65) Prior Publication Data

US 2003/0169497 A1    Sep. 11, 2003

(30) Foreign Application Priority Data

Mar. 8, 2002    (JP)    .............................. 2002-064430

(51) Int. Cl.
*G02B 27/28*    (2006.01)

(52) U.S. Cl. ...................................... 359/485; 264/1.34

(58) Field of Classification Search ................. 349/96, 349/105; 359/490, 485; 428/1.31; 264/1.34, 264/1.6

See application file for complete search history.

(56) References Cited

U.S. PATENT DOCUMENTS

| | | | |
|---|---|---|---|
| 6,731,357 B1* | 5/2004 | Tachibana et al. | 349/96 |
| 6,859,242 B1* | 2/2005 | Kawanishi | 349/96 |
| 2002/0160172 A1* | 10/2002 | Shimizu et al. | 428/220 |
| 2003/0001989 A1* | 1/2003 | Kusumoto et al. | 349/96 |
| 2003/0230379 A1* | 12/2003 | Roubik | 156/229 |
| 2004/0119178 A1* | 6/2004 | Kuwamura | 264/1.34 |

FOREIGN PATENT DOCUMENTS

JP    54-26582 B1    9/1979

* cited by examiner

*Primary Examiner*—Leonidas Boutsikaris
(74) *Attorney, Agent, or Firm*—Birch, Stewart, Kolasch & Birch, LLP

(57) ABSTRACT

In a polarizing filter, first and second protective films are adhered to a polarized film. The first protective film has rigidity at less than 320 kPa·m and degree of curl at more than 10 mm. The second protective film is not curled and has rigidity at more than 320 kPa·m. The protective films are produced in a solution casting method in which a solution is cast on a substrate continuously fed. The solution is dried to form the protective film. When a remaining solvent in the protective film is less than 60%, then the protective film is peeled from the substrate.

4 Claims, 5 Drawing Sheets

PROTECTIVE FILM FOR POLARIZING FILTER AND METHOD FOR PRODUCING THEREOF AND POLARIZING FILTER

BACKGROUND OF THE INVENTION

1. Field of the Invention

The present invention relates to a protective film for a polarizing filter, a method for producing the protective film from a solution, and the polarizing filter in which the protective film is used.

2. Description Related to the Prior Art

Recently, a technical development of liquid crystal displays used for a personal computer, a mobile, a car navigation system, a television or the like is remarkable, and an amount of their products becomes much larger. It causes to rapidly increase demands and supplies of the polarizing filter which is necessary for the liquid crystal displays and those of a protective film which is used for the polarizing filter. In the polarizing filter, two of the protective films are used as optical films which are adhered to both sides of a polarized film to protect it and to provide stabilization in size. A cellulose acetate film is preferably used as the protective film for the polarization plate, while the cellulose acetate film is excellent in transparency, smoothness, and optical isotropy.

The cellulose acetate film is produced in a film producing method from a solution. Concurrently, cellulose acetate and other additives are dissolved to a solvent for preparing a dope solution (hereinafter, dope). Then the dope is cast on a substrate, such as a endless drum or a band whose surface is smooth, and then dried on the substrate to be a continuous film. The continuous film is peeled from the substrate, and thereafter dried in a drying section having a tension frame and a drying area. In the tension frame, the continuous film is supplied with a specified tension, substantially without contact. In the drying area, the continuous film is fed by rollers and usually exposed in an air blow. Thereafter, the continuous film, as having a length between several hundreds and several thousands meter in accordance with usage thereof and capacity of equipment, is wound around the cylindrical rod which is usually made of resin, metal, woods, thick paper and the like. Then the continuous film is packed as a product.

In producing the continuous film of cellulose acetate, the dope must be enough solidified to have self-supporting properties, and thus it can be peeled as the continuous film from the substrate. However, physical property of the continuous film becomes different in accordance with process before and the situations after being peeled.

There are two methods for peeling the continuous film from the substrate:

(1) drying method, in which a hot air is blown to the dope on the substrate so as to decrease the amount of solvent in the dope to form the continuous film;

(2) cooling method, in which the dope is cooled down on the substrate to gel and to form the continuous film. The above two methods each have merits and demerits. The continuous films produced in the above two methods are sold as the optical film such as the protective film for the polarizing filter.

However, the continuous films produced with the above two methods have different properties from each other. In the continuous film produced with the drying method, the weight percentage of the solvent is decreases below 60% before peeling of the continuous film from the substrate. In this case, as the time of the dry on the substrate is long, there is a difference in chemical structure between the front and back side of the continuous film. However, as the primary dry is advanced slowly, the crystallization of polymer does not proceed so much, and the produced continuous film becomes soft. An elastic modulus of the continuous film in being tensed in the casting direction of the dope is less than about 4 GPa.

In producing the continuous film in the drying method, the dry of the dope proceeds on the substrate. Therefore, when the continuous film is peeled from the substrate, a distribution of the remaining solvent in thickness is large. The density of the remaining solvent in a side of the continuous film that has been contacted to the substrate is larger than in another side. Therefore, the produced film shrinks more on a side of a surface which has been contacted to the substrate than in another side. Thus the continuous film is curled. The curl is decreased in a curl control in situation, as disclosed in Japanese Patent 54-26582.

Otherwise, in the continuous film produced in the cooling method, the percentage of solvent remaining in the continuous film become more than 60%. In this case, the dope has usually no self-maintaining property in a room temperature, but is cooled to become gel and form the continuous film in a gel state. Then the dope is peeled as the film from the substrate, and the film is fed to a tension frame for drying both surface without contact thereon. In this method, as the dope on the substrate is dried in a short time, the difference in chemical structure between the both sides is not so large. Further, as the polymer is crystallized rapidly as being dried from both sides of the continuous film, the speed of drying is high, which causes the produced continuous film hard. The elastic modulus is more than about 4 Gpa. Note that the percentage of solvent remaining in the continuous film is calculated in an absolute drying method. Namely, the weight of a sample of the continuous film is measured, whose value is determined as A (g), and thereafter dried in an atmosphere at 120° C. for 90 minutes, and then measured whose value is determined as B (g).

Percentage of remaining solvent (%)=$(A-B)/A \times 100$.

By the way, some problems often occur in producing a polarizing filter by combining the optical films having different properties. These problems are especially remarkable when in producing the polarization plate by combining the optical films having different elastic modulus. In FIG. 5A, a flat protective film 81 disposed in a side of a polarized film 82 has a smaller elastic modulus than a protective film 83 disposed in another side of the polarized film 82. As shown in FIG. 5B, the protective film 81, 83 are attached to both sides of the polarized film 82 to construct a polarizing filter 80. Then, while a long time has passed, the polarizing filter 80 has a curl such that the protective film 81 may have smaller elastic modulus, as shown in FIG. 5C.

Further, even though there is no difference in elastic modulus, the difference of thickness between the protective films causes the curl of the polarizing filter, such that the thinner protective film may be disposed in an inner side of the curl. The reason therefor is that a variation in size causes to generate a shrinking force. Thereby the protective films having different rigidities have different resistance forces to the shrinking forces. In the polarized film of the polarizing filter, the rigidity is determined as the product of thickness by elastic modulus. Usually, the polarized film is produced by being extended in a lengthwise after polarizing material, such as the iodine, two color dye, two pigment molecule or the like, is absorbed on a film made of polyvinyl alcohol and the like. Then the protective films are attached through an adhesive agent to both surfaces of the polarized film produced in this method. When a long time passes, then a stress remaining in the polarized film after applied for extending it causes to generate a shrink force in an extending direction in the polarized film. The protective film has a function for supply a force against the shrink force which causes to inhibit the polarizing filter to shrink. However, when there is a difference in the rigidity between the protective films attached to both surfaces of the polarized film, then the amount of shrink is different between the both sides of the polarizing filter. Namely, the surface on which the protective film of smaller rigidity is attached shrinks more than another surface. Accordingly the polarizing filter curls.

Recently, the demand of the polarizing filter accelerately increases, and the more of the protective films are used. In this situation, it becomes more difficult to select the protective films having a small difference in the rigidity between both sides of the polarizing filter. Further, recently, an optical compensation film is attached to the polarized film instead of the protective film. In the optical compensation film, an optical anisotropic layer is formed on a surface of a film body of the protective film. When the optical compensation film is used for the polarizing filter, a birefringence of the liquid crystal has effects for easily perceiving images on a liquid crystal panel even though they are watched diagonally. As the optical compensation film has the optical anisotropic layer, the thickness of the optical compensation film becomes larger. When the protective film is applied to the opposite side to the optical compensation film, then the rigidity of the protective film is smaller than the optical compensation film. In order to make the difference of rigidity between the protective film and the optical compensation film smaller, the thickness of the protective film must be made larger. Accordingly, the liquid crystal display becomes thicker and then the value of thereof as the products will become lower.

SUMMARY OF THE INVENTION

An object of the present invention is to provide a polarizing filter which does not curl so much.

Another object of the present invention is to provide a protective film for preventing the curl of the polarizing filter.

In order to achieve the object and the other objects, the protective film for polarizing filter of the present invention includes a film body whose rigidity is less than 320 kPa·m. The film body is formed of cellulose acetate to curl. A degree of curl of the protective film is more than 10 mm.

In the polarizing filter of the present invention, a protective film whose rigidity is less than 320 kPa·m and which is curled with a degree of curl more than 10 mm is adhered to a first surface of the polarized film. In the protective film, an inner surface of a curl contacts to the first surface of the polarized film. Further, a second protective film whose rigidity is more than 320 kPa·m is adhered to a second surface of the polarized film.

Further, in a method of producing the protective film for the polarizing filter of the present invention, a solution is cast on a substrate which is continuously fed. A hot air blow is applied to the solution on the substrate. Then the solution is peeled as the protective film from the substrate when a remaining solvent becomes less than 60%. The protective film has a curl in a widthwise direction by drying, and wound. Further, the curl may be adjusted before winding the protective film.

According to the protective film for the polarizing filter of the present invention, as the protective film has a predetermined rigidity and the predetermined curl, the polarizing filter hardly has the curl. According to the polarizing filter, the polarizing filter is constructed of the first protective film having the predetermined curl and the second protective film whose rigidity is more than that of the first protective film. Accordingly, the polarizing filter hardly curls.

According to the method of producing the protective film for polarizing filter of the present invention, as the protective film is formed so as to have a predetermined curl, it is prevent to curl the polarizing filter in which the protective film is used.

BRIEF DESCRIPTION OF THE DRAWINGS

The above objects and advantages of the present invention will become easily understood by one of ordinary skill in the art when the following detailed description would be read in connection with the accompanying drawings.

PREFERRED EMBODIMENTS OF THE INVENTION

[Method of Producing Film from Solution]

Figure 1A:
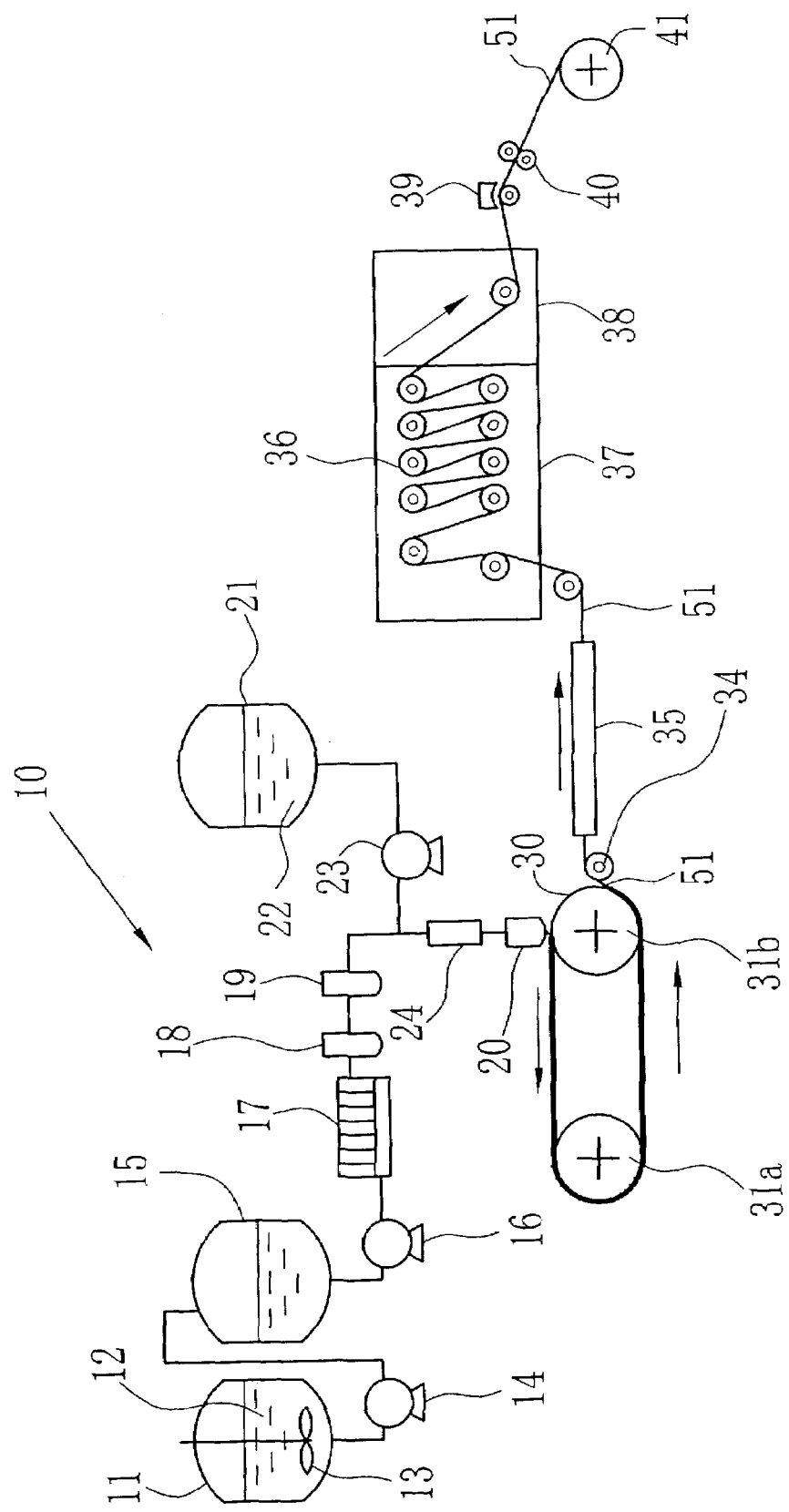
FIG. 1A is a schematic diagram of a first embodiment of producing line of a continuous protective film for a polarizing filter of the present invention.

In FIG. 1A, a producing line 10 for producing a protective film 51 from a dope solution (hereinafter dope) 12 has a mixing tank 11 and an additive tank 21. In the mixing tank 11, polymer and solvent thereof are supplied and mixed by a mixer 13 to prepare the dope 12 uniformly. The dope 12 is fed to a stock tank 15 by a pump 14. After storing the dope 12 in the stock tank 15, the dope 12 is fed to filtration devices 17, 18, 19 to remove impurities. Then the dope 12 is fed to a static mixer 24. Otherwise, in the additive tank 21, a solution 22 of a ultra-violet absorptive agent is stored as an additive of the dope 12. The solution 22 is fed to the static mixer 24 by a pump 23, and added to the dope 12. The static mixer 24 mixes the solution 22 with the dope 12 uniformly. Then the dope 12 is fed to a dye 20 at a same flow rate. The dope 12 is discharged from the dye 20 onto a belt 30 confronting to the dye 20. The belt 30 is continuously fed by rollers 31a, 31b rotated by a drive device (not shown). On the belt 30, the solvent of the dope 12 gradually evaporates to become the protective film 51.

In the producing line 10, the protective film 51 is peeled from the belt 30 with a dry peeling method. In the dry peeling method, a heated air is blown to the dope 12 on the belt 30 to dry it. Thus the amount of the remaining solvent in the dope 12 decreases so as to form the protective film 51, and the protective film 51 is peeled from the belt 30. Thereby it is preferable that the percentage of the remaining solvent is less than 60%. After peeling from the belt 30, the protective film 51 is fed to a tension frame 35, in which both edges of the protective film 51 are hold to dry the protective film 51 with applying a tension to it. Thus the elastic modulus of the protective film 51 decreases, and the protective film 51 becomes softer.

Thereafter, the protective film 51 is further dried in a drying area 37 including plural rollers 36, and cooled to a room temperature in a cooling area 38. Both side edges of the protective film 51 fed out from the cooling area 38 are cut off with a cutting device 39. Until cutting, the protective film 51 has a curl in a widthwise direction. In order to adjust the curl, the protective film 51 is fed to a curl controller 40, and wound with a winding device 41 thereafter.

In a method for controlling of the curl control, a steam gas of high temperature and a high humidity is blown to the protective film 51 directly, and a steam of organic solvents (for example, dichloromethane, methanol, acetone and the like) is blown to the protective film, and the organic solvents are dried after coating it. Further, one side of the film is heated and thereafter cooled down rapidly. These methods are, however, not restricted in them. Note that when the protective film 51 does not have any curl before reaching the curl controller 40, then the curl of the protective film 51 is formed with the film controller 40. (See, FIG. 2A)

Figure 1B:
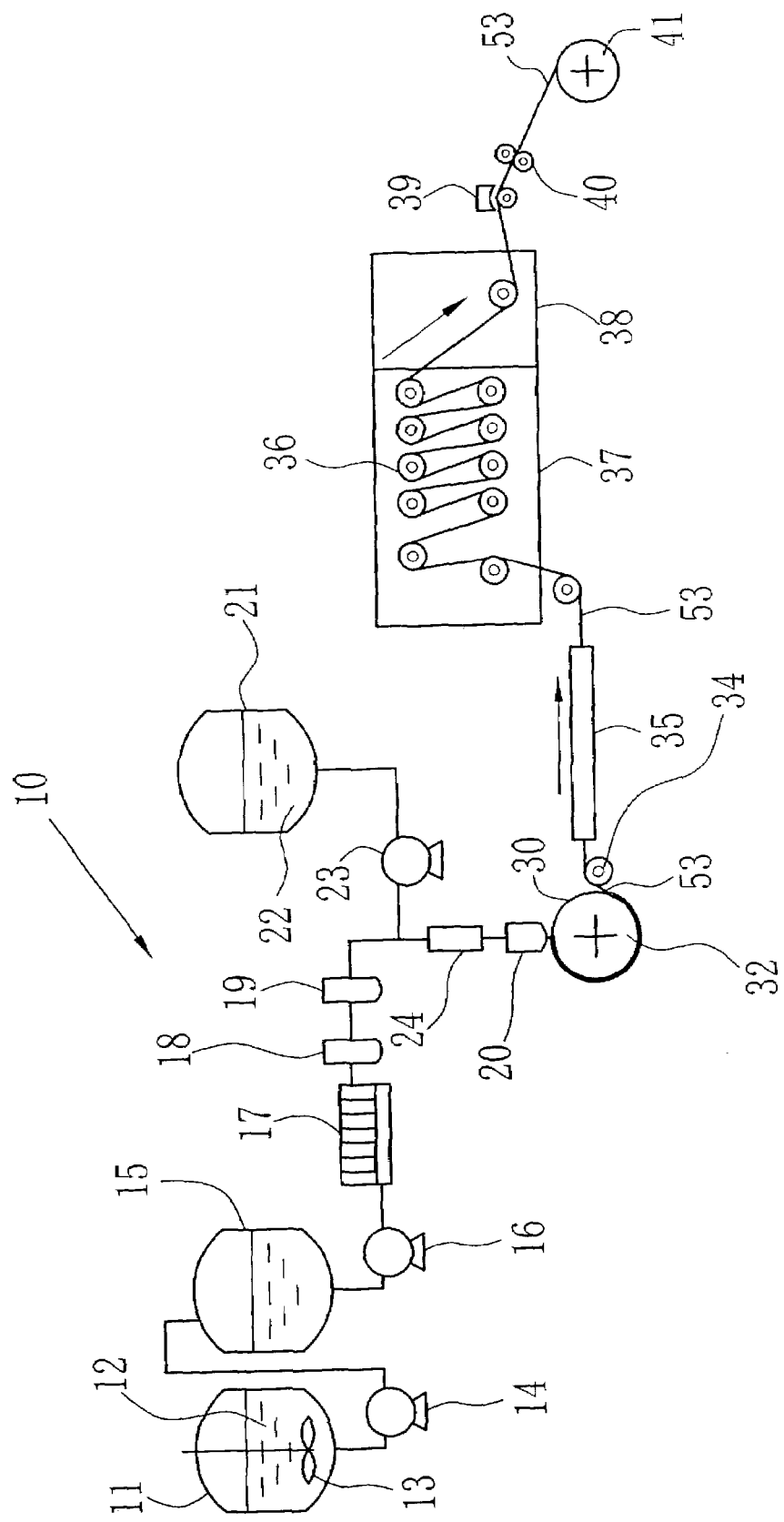
FIG. 1B is a schematic diagram of a second embodiment of producing line of another continuous protective film for the polarizing filter of the present invention.

Further, in FIG. 1B, a drum 32 in which a cooling medium passes to cool down a surface of the drum 32 confront to the die 20. After applying the dope 12 onto the drum 32, a protective film 53 formed of the dope 12 is peeled from the drum 12 with a cool peeling method. In the cool peeling method, as the surface of the drum 32 is cooled down, the solvent of the dope 12 hardly evaporates. However, the dope 12 gels in cooling down to become the protective film 53 which has self-maintaining properties. Thus the protective film 53 can be peeled from the drum 32. Note that the percentage of the remaining solvent in the dope 12 is more than 60%, in whose situation the dope 12 could not form the protective film 53 at a room temperature. After peeling from the drum 32, the protective film 53 is fed to the tension frame 35. The tension frame 35 holds both edges of the protective film 51 to apply a tension force. Thus the both surfaces of the protective film 53 dry rapidly, and are fed to the drying area 37. Thereafter, the curl control is carried out with the curl controller 40 to form the flat protective film 53, and the protective film 53 is wound with the winding device 41. The elastic modulus of the protective film 53 is more than 4 Gpa and becomes harder. Note that the protective film 53 is formed in this embodiment so as to have a larger rigidity than the protective film 51.

[Polymer]

Polymers used for the present invention is not especially restricted. However, it is preferable to use cellulose acylate, especially cellulose triacetate (hereinafter TAC) whose degree of acetylation is 59.0%–62.5%. The protective films formed of the TAC are excellent in optical properties and stability of size.

[Solvent]

In the present invention, any of the known solvents may be used for preparing the dope. Preferably, hydrocarbon halides such as methylene chloride (dichloromethane), esters, ethers, alcohols and the like are used. However, the solvent is not restricted in them. Further, plural sorts of the solvents may be mixed for preparing the dope.

[Additives]

Any of the known additives may be added to the dope. As the additives, there are plasticizers, ultraviolet stabilizers, matting agents and the like. However, the additives are not restricted in them. Further, talc may be added as the additives to the dope. These additives may be mixed to the dope while it is prepared. Otherwise, after preparing the dope, the dope and the additives may be mixed during feeding in a feed line with a static mixer. Note that plural of the additives may be added to the dope.

[Preparation of Dope]

The polymers are dissolved to the solvents for preparing the dope. Thereby the additives may be added to them. Thereafter, the foreign particles in the dope are usually removed with filtration. Several sorts of already known filter materials may be used, such as filter paper, filter cloth, non-woven fabric, meshed metal, calcinated metal, porous plate and the like. Filtration prevents the film products from having damages and defaults that are caused by the foreign particles in the dope.

In order to remove the foreign particles and undissolved materials, the dope may be heated to perfectly dissolve them. There are several heating methods, such as a method in which the dope is stirred and heated in a stationary tank, a method in which the dope is heated during heating with several kinds of heat exchangers of multi pipe type, jacket pipe type with static mixer, and the like. Further, the pressure in the heating device may become higher during heating such that the temperature of the dope may become higher than the melting point thereof. Furthermore, a cooling process may be provided after the heating process, and the heating and cooling processes may be repeated sequentially. Thus, the solubility of the foreign particles and the undissolved materials improves to decrease the dependence on the filtration for removing them.

Figure 2A:
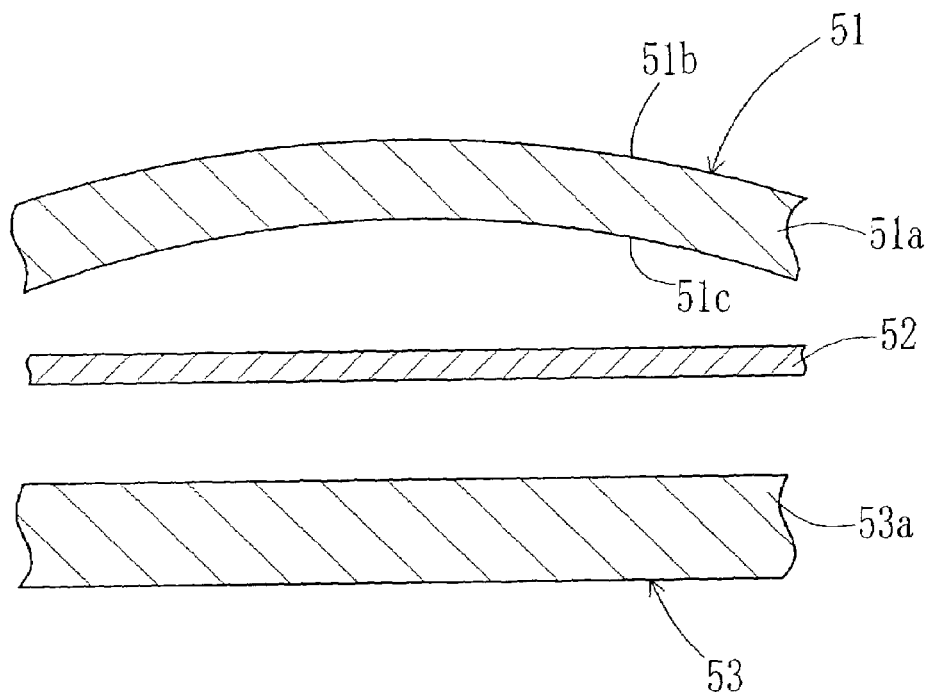
FIG. 2A is a sectional view illustrating a situation when the continuous protective films are attached to a polarized film.
Figure 2B:
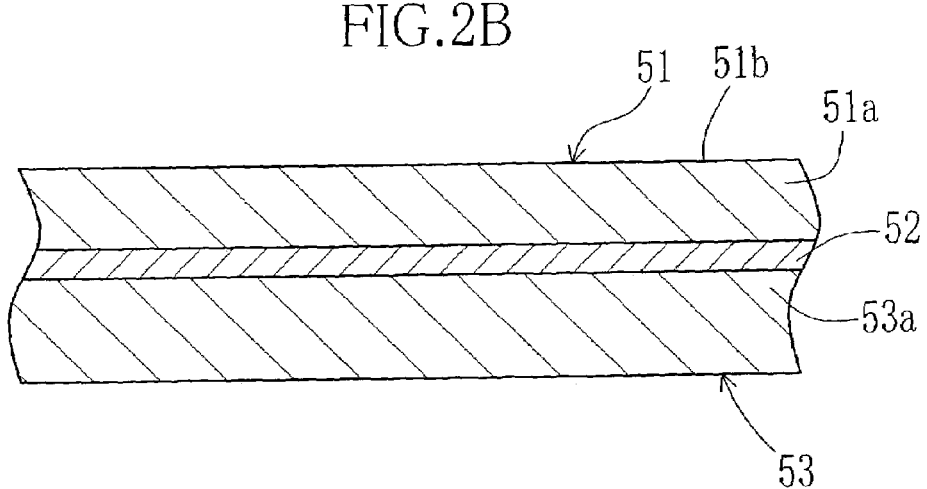
FIG. 2B is a sectional view illustrating a situation of a polarizing filter after a long time after producing thereof.

As shown in FIGS. 2A–2B, the polarizing filter 50 is formed by attaching the protective films 51 and 53 to both surfaces of a polarized film 52. As shown in FIG. 2A, the protective film 51 includes a curling film body 51a, a convex surface 51b and a concave surface 51c, and the concave surface 51 faces to the polarized film 52. The rigidity of the film body 51a is less than 320 kPa·m. Otherwise, the protective film 53 includes a film body 53a without curling. The rigidity of the film body 53a is more than 320 kPa·m. As shown in FIG. 2B, the polarizing filter 50 in which the protective films 51 and 53 are attached to the polarized film 52 is flat even after a long time has passed from producing the polarizing filter 50. In the polarizing filter 50, variations of circumstance of the polarizing filter 50 causes the polarized film 52 to shrink. In this case, the rigidity is different between the protective films 51 and 53, a surface of the polarized film that contacts to the protective film 51 tends to shrink more than another surface that contacts to the protective film 53. Accordingly, the polarizing filter 50 has a shrinking force to shrink to a side of the protective film 51. In the present invention, as the whole of the concave surface 51c of the protective film 51 contacts to the surface of the polarized film 52, the curling force of the protective film 51 and the shrinking force of the polarizing filter 50 are urged in opposite directions to negate each other. Therefore, the polarizing filter 50 has no curling or a slight curling without decreasing a practical utility, even after a long time has passed.

Further, in order to prevent the polarizing filter 50 from curling, a difference of the rigidity between the protective films 51 and 53 is less than 200 kPa·m. When the difference is more than 200 kPa·m, then effects of the present invention are not expected.

In the above embodiment, in order to prevent the polarizing filter 50 from curling, the protective films 51, 53 are produced in a producing line 10 in respective FIGS. 1A and 1B. In the present invention, it is preferable that the remaining solvent in the dope 12 on the belt 30 is decreased below 60% to obtain the protective film 51 in dry peeling method. Further, in the above embodiment, the protective film 53 contains the remaining solvent at more than 60% when being peeled from the belt 30 so as to have the larger rigidity than the protective film 51. However, the present invention is not restricted in them. For example, the protective films 51 may be produced in the producing line 10 in FIG. 1B, and the protective films 53 may be produced in the producing line 10 in FIG. 1A.

In the protective film 51 of the above embodiment, the concave surface 51c to be contacted to the polarized film 52 is formed in a side of the dope 12 that has been contacted to the belt 30. However, the present invention is not restricted in it. The concave surface of the protective film may be formed in another side of the dope. Also in this case, the concave surface is contacted to the polarized film in the polarizing filter.

Otherwise, the two protective films 51 may be attached to both sides of the polarized film 52 in accordance with the situation and the condition of production and demand. In this case, the two convex surfaces 51b or the two concave surfaces 51c of the polarized films 51 are contacted to the both surfaces of the polarized film 52 respectively. Thus the force of the curl in each protective film 51 is negated. Accordingly, the protective film of the present invention may be combined with the same one or that having the larger rigidity, and therefore the present invention has flexibility for the products and the demand.

Figure 3:
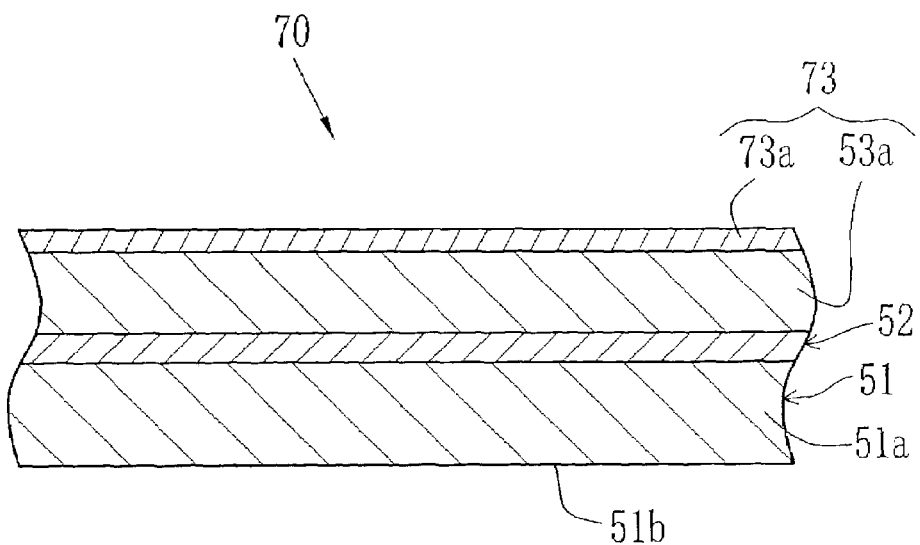
FIG. 3 is a sectional view of a polarized film in which an optical compensation film is used.

Further, as shown in FIG. 3, a polarizing filter 70 includes an optical compensation film 73 in which an optical anisotolopic layer 73 is provided on a surface of the film body 53a, and positioned to an outer side of the polarizing filter 70. In the optical anosotolopic layer 73 a, a discotic liquid crystal is oriented.

Note that a glare shielding layer may be formed on the surface of the protective film of the present invention, and thus the protective film can be used as a light function film for parts of a liquid crystal display.

[Experiment]

The Experiment of the present invention is carried out, in which the following Examples and Comparisons are used. However the present invention is not restricted in them. The explanations of the Example 1 are made in detail, and the same explanations of other Examples and Comparisons are omitted.

EXAMPLE 1

<Preparation of Dispersion of Fine Particle>

| | |
|---|---|
| Silica gel | 2.00 wt. % |
| (AEROSIL produced by NIPPON AEROSIL CO. LTD.) | |
| Cellulose acetate | 2.00 wt. % |
| (Degree of acetylation: 61.0%) | |
| Triphenyl phosphate | 0.16 wt. % |
| Biphenyl diphenyl phosphate | 0.08 wt. % |

-continued

| | |
|---|---|
| Methylene chloride | 88.10 wt. % |
| Methanol | 7.66 wt. % |

After mixing the above substances, the particles of silica gel are dispersed of 0.5 μm volume averaged diameter with Attritor produced by Mitsui Mining Co., LTD. Note that the volume-averaged diameter is measured with a dispersion measuring device LA920 produced by HORIBA LTD.

<Preparation of Polymer Solution for Dope>

| | |
|---|---|
| Cellulose triacetate | 89.3 wt. % |
| (Degree of acetylation: 61.0%) | |
| Triphenyl phosphate | 7.1 wt. % |
| Biphenyl diphenyl phosphate | 3.6 wt. % |

A solid material of 100 part by weight, which contains these substances at the above percentages, is dissolved into the solvent containing the following substances:

| | |
|---|---|
| Dichloromethane | 92 wt. % |
| Methanol | 8 wt. % |

Thus a polymer solution for dope is prepared. A density of the solid material in the polymer solution for dope is 18.5%.

<Preparation of Dope>

The fine particle dispersion at 6.5 part by weight are mixed in the polymer solution in accordance with the solid material of the polymer solution for dope at 100 part by weight, and the mixture of the dispersion and the polymer solution is agitated to obtain the dope. The dope is filtrated with a filter paper (#63 produced by Toyo Roshi Kaisha Ltd.), a calcinated metal filter (06N, in which nominal dimameter of holes is 10 μm, produced by Nippon Seisen Co. Ltd.), then a mesh filter (RM, whose nominal dimater of holes is 45 μm, produced by NIHON POLL LTD.).

<Preparation of Ultraviolet Stabilizer Solution>

| | |
|---|---|
| 2(2'-hydroxy-3',5'-di-tert-butylphenyl)-5-chlorobenzotriazol | 5.83 wt. % |
| 2(2'-hydroxy-3',5'-di-tert-amilphenyl) benzotriazol | 11.66 wt. % |
| Cellulose acetate | 1.48 wt. % |
| (Degree of acetylation: 61.0%) | |
| Triphenyl phosphate | 0.12 wt. % |
| Biphenyl diphenyl phosphate | 0.06 wt. % |
| Dichloromethane | 74.38 wt. % |
| Methanol | 6.47 wt. % |

The above substances are mixed to obtain the ultraviolet stabilizer solution. Then the ultraviolet stabilizer solution is filtrated with Astro Pore 10 μm filter produced by Fuji Photo Film Co. Ltd.

The ultraviolet stabilizer solution is mixed with the dope in the feed line of the dope such as the mixed dope may contain the ultraviolet stabilizer solution at 1.04 wt. % of the solid material.

In the producing line 10 of FIG. 1A, the dope is cast on the substrate such that the thickness of the wound protective film is 80 µm. On the substrate, the hot air blow is applied to the dope to have the self-supporting properties, and then the dope is peeled as the protective film 51 from the substrate 12. Thereby part of the peeled protective film 51 is sampled for measuring the percentage of the remaining solvent. The obtained percentage is 39%. Then, the protective film 51 is fed in the tension frame 35, in which both edges of the protective film 51 is held to dry it. Thereafter, the protective film 51 is heated and dried in the drying area 37 such that the temperature of the protective film 51 becomes 130° C. Then the protective film 51 is cooled in the cooling area 38 such that the temperature of the protective film becomes the room temperature. Further, the edges of the protective film 51 are cut off with the cutting device 39 such that the width of the protective film 51 may be 1340 mm. Thereafter, the protective film 51 is wound with the winding device 41 about a core made of FRP resin, whose diameter is 168 mm.

<Producing of Polarized Film>

PVA film (75 µm) produced by KURARAY CO., LTD. is inserted in a solution in which iodine and potassium iodide are contained at 0.3 g/L and 18.0 g/L respectively, and thereafter inserted and stretched in a solution at 50° C., in which boric acid, potassium iodide and ferrous chloride are contained at 80 g/L, 30 g/L and 10 g/L respectively. Thus the size of the PVA film becomes 5 times. Thereafter, the PVA film is dried at 60° C. for five minutes to obtain the polarized film 52. Further, the protective films 51 made of cellulose acetate are adhered to the polarized film with an adhesive agent which is a solution of PVA (PVA-117 produced by KURARAY CO., LTD.) at 4% after being saponified. Thereby one of the protective films is the protective film 51 produced in the above method, and the inner surface 51c is contacted to a surface of the polarized film. Furthermore, another surface of the polarized film is attached to a TD80UF film produced by Fuji Photo Film Co. Ltd. (elastic modulus: 4.1 Gpa, thickness: 80 µm, rigidity: 328 kPa·m).

EXAMPLE 2

In Example 2, the solvent of the polymer solution contains the following substances.

| Dichloromethane | 85 wt. % |
| Methanol | 15 wt. % |

Further, the protective film 51 is peeled from the substrate when the amount of the remaining solvent is 44%. Other conditions are the same as Example 1.

EXAMPLE 3

In Example 3, the protective film 51 is peeled from the substrate when the amount of the remaining solvent is 31%. Other conditions are the same as Example 2.

Comparison 1

In Comparison 1, the curl control is made just before the protective film 51 is fed into the cooling area. In the curl control, the temperature of the protective film is kept at 95° C. during feeding the protective film 51, and thereby the steam at 120° C. is blown at the amount ratio of 1 kg/m$^2$ to the surface of the protective film 51 that has not been contacted to the substrate. Thereafter, the protective film 51 is fed for more than 30 seconds in a zone in which the temperature is kept from 65° C. to 85° C. Other conditions are the same as Example 1.

Comparison 2

The maximum temperature in the drying zone is 80° C. Other conditions are the same as Example 1.

Comparison 3

The thickness of the protective film 51 is 30 µm. Other conditions are the same as Example 1.

Comparison 4

While the protective film 51 is attached to the surface of the polarized film, a WV film (thickness: 110 µm, elastic modulus: 3.6 Gpa, rigidity: 396 kPa·m ), which is produced by Fuji Photo Film Co. Ltd., is attached to the another surface instead of the TD80UF film. Other conditions are the same as Comparison 1.

EXAMPLE 4

In Example 4, the curl control is made the same as Comparison 1. Other conditions are the same as Example 1.

EXAMPLE 5

In Example 5, the curl control is made the same as Comparison 1. Other conditions are the same as comparison 2.

EXAMPLE 6

While the protective film 51 is attached to the surface of the polarized film, the WV film produced by Fuji Photo Film Co. Ltd. is attached to the another surface instead of the TD80UF film. Other conditions are the same as Example 1.

<Estimation of Polarizing Filter>

The elastic modulus, the rigidity and the degree of curl of the protective film 51 and the degree of curl of the polarizing filter 50 are measured in each of the above Examples and Comparisons. In order to measure the elastic modulus, a sample of the protective film is stretched with TENSILON in the feeding direction on the substrate in producing the protective film 51. The rigidity (kPa·m ) of the protective film is obtained as a multiple of the thickness (µm) and the elastic modulus (Gpa).

Figure 4:
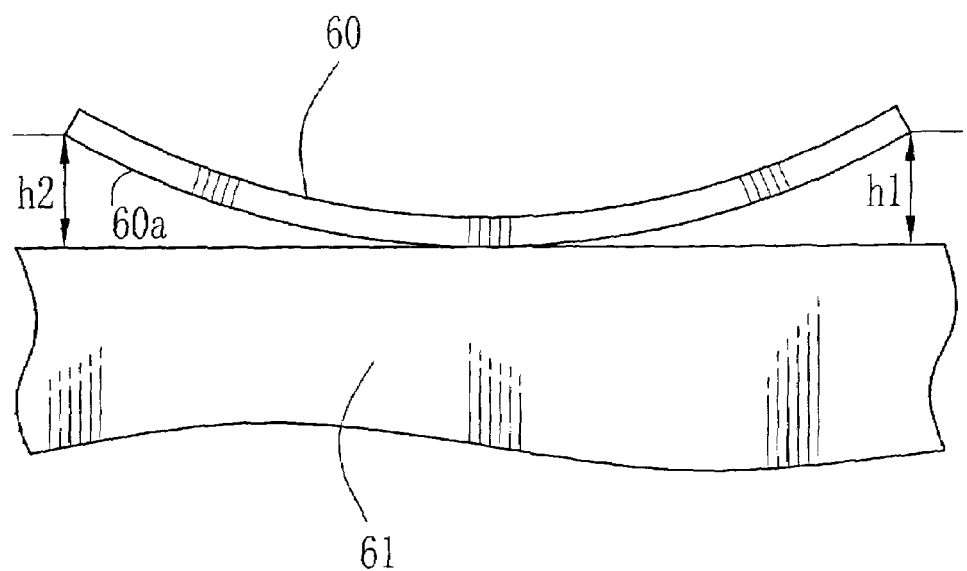
FIG. 4 is an explanatory view when the degree of curl is measured in the protective film of the present invention.
Figure 5A:
FIG. 5A is a sectional view illustrating a situation of when continuous protective films of the prior art are attached to a polarized film.
Figure 5A:
Figure 5A:
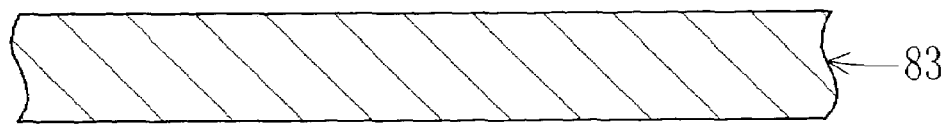
Figure 5B:
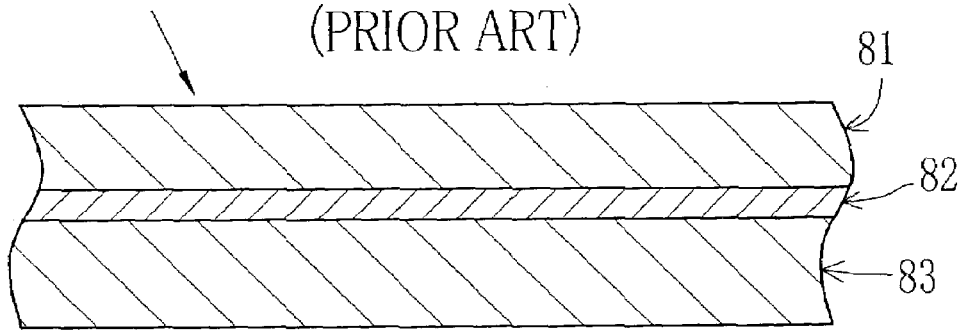
FIG. 5B is a sectional view after producing a polarizing filter of the prior art.
Figure 5C:
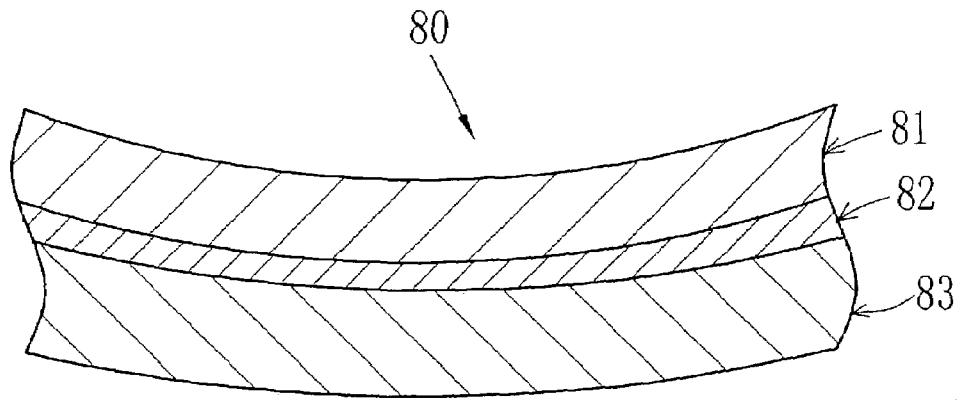
FIG. 5C is a sectional view illustrating a situation of the polarizing filter after a long time from the situation of FIG. 5B.

The degree of curl of the protective film 51 is measured as follows. The continuous protective film 51 is cut at 305 mm in the lengthwise direction and 254 mm in the widthwise direction to obtain a sample film 60 as illustrated in FIG. 4. The sample film 60 is set on a horizontal stage 61 such that an convex surface 60a of the sample film 60 contacts to the horizontal stage 61. Then the sample film 60 is settled in atmosphere at 25° C. and 65% RH for three hours. Then the sample film 60 curls, and four corners thereof leave up from the horizontal stage 61. Note that only two corners are illustrated in this figure, and they are apart from the horizontal stage 61 at H1 and H2 (mm). The average of the length between the horizontal stage and the four corners is determined as the degree of curl. It is preferable that the degree of curl is 10 mm in this embodiment.

Note that the above method of measuring the degree of curl is substantially applied to the polarizing filter of the present invention. In this case, however, the continuous polarizing filter 50 is cut to obtain a rectangular sample plate (not shown) such that an angle of each side of the sample plate to a feeding direction of the polarized film during producing thereof (or to the lengthwise direction of the continuous polarizing filter) is 45°. Further, the length of the longer sides of the sample plate is 305 mm, and that of the shorter sides is 254 mm. The sample plate is settled on the horizontal station 61 in atmosphere at 25° C. and 65% RH for forty-eight hours. Thereafter, the sample film curls, and two corners on one of two diagonal lines that crosses at a smaller cross angle to the feeding direction of the polarized film leave from the horizontal station 61. The average of length between the horizontal station 61 and the two corners is determined as the degree of curl of the polarizing filter.

The result of the Experiment is illustrated in Table 1.

TABLE 1

|  | EMF Gpa | THF μm | RI1 kPa·m | RI2 kPa·m | RI2–RI1 kPa·m | DCF mm | DCP mm | EST. |
| --- | --- | --- | --- | --- | --- | --- | --- | --- |
| Ex. 1 | 3.4 | 80 | 272.0 | 328.0 | 56.0 | 27.0 | 11.5 | Pass |
| Ex. 2 | 3.8 | 80 | 304.0 | 328.0 | 24.0 | 37.0 | 8.0 | Pass |
| Ex. 3 | 3.8 | 80 | 304.0 | 328.0 | 24.0 | 40.8 | 4.0 | Pass |
| Ex. 4 | 3.7 | 80 | 296.0 | 328.0 | 32.0 | 22.5 | 14.0 | Pass |
| Ex. 5 | 3.3 | 80 | 264.0 | 328.0 | 64.0 | 18.0 | 15.0 | Pass |
| Ex. 6 | 3.4 | 80 | 272.0 | 396.0 | 124.0 | 27.0 | 13.5 | Pass |
| Com. 1 | 3.4 | 80 | 272.0 | 328.0 | 56.0 | 2.3 | 61.5 | Reject |
| Com. 2 | 3.6 | 80 | 288.0 | 328.0 | 40.0 | 0.3 | 66.5 | Reject |
| Com. 3 | 3.4 | 30 | 102.0 | 328.0 | 226.0 | 35.0 | 41.0 | Reject |
| Com. 4 | 3.4 | 80 | 272.0 | 396.0 | 124.0 | 2.3 | 68.0 | Reject |

EMF: Elastic modulus of protective film
THF: Thickness of protective film
RI1: Rigidity of protective film of the present invention in polarizing filter
RI2: Rigidity of another protective film in polarizing filter
DCF: Degree of curl of protective film
DCP: Degree of curl of polarizing filter
EST.: Estimation
Ex.: Example
Com.: Comparison In practice, the degree of curl of the polarizing filter is less than 20 mm, preferably less than 15 mm, especially less than 10 mm. Accordingly, the degree of curl of the protective film is more than 10 mm, preferably more than 20 mm, particularly more than 30 mm, and especially more than 40 mm.

However, when the difference of the rigidity between the two protective films in the polarizing filter is more than 200 kPa·m, it is too large to expect the effects of the present invention. Further, when the difference is less than 20 kPa·m, it is so small that there is no problem of the difference of the rigidity. In this case, the polarizing filter can be produced in the method which has been already known.

The conditional difference between Comparison 2 and Example 5 is the condition of the curl control. The curl control is made in Example 5 while not in Comparison 2, which causes on the difference of the elastic modulus between them. In Example 5, the physical property of the protective film 51, especially near the surface thereof, to which the curl control has been carried out, varies during the curl control. Accordingly, the rigidity of the protective film 51 in Example 5 became smaller than that in Comparison 2. The curl control has an effect to decrease the physical property and cancel the effect of the curl. Therefore, it is preferable to obtain the predetermined degree of curl without curl control. When the degree of curl is too large, then part of the protective film folds and wrinkles, which makes the effects of producing smaller. Accordingly, the degree of curl is preferably less than 80 mm, especially 65 mm.

Various changes and modifications are possible in the present invention and may be understood to be within the present invention.

What is claimed is:

1. A polarizing filter comprising:
   a polarized film having a first surface and a second surface in a side opposite to said first surface;
   a first protective film having a rigidity less than 320 kPa·m and being curled with a degree of curl more than 10 mm so as to form a concave surface and a convex surface; wherein said degree of curl is an averaged height of four corners of a curling test film tip from a horizontal stage when said curling test film tip is settled on said horizontal stage in atmosphere at 25° C. and 65% RH for a predetermined time so as to curl upwards, and said curling test film is obtained by cutting said protective film to have a size 305 mm×254 mm,
   a second protective film whose rigidity is more than 320 kPa·m, said second protective film being adhered to said second surface of said polarized film, and
   an adhesive agent applied to said concave surface of said first protective film, said adhesive agent adhering said protective film to said polarized film.

2. The polarizing filter as claimed in claim 1, wherein a difference of rigidity between said first protective film and said second protective film is more than 20 kPa·m and less than 200 kPa·m.

3. The polarizing filter as claimed in claim 2, wherein said polarizing filter being curled to have a degree of curl at less than 20 mm.

4. The polarizing filter as claimed in claim 1, further comprising an optical compensation film having an optical anisotropic layer in which a discotic liquid crystal is oriented, said optical compensation film being adhered on said second surface of said polarized film, instead of said second protective film.

* * * * *